Aug. 20, 1929.                F. JENKINS                1,725,002
                        HOLDER FOR POLISHING DEVICES
                           Filed Oct. 3, 1927
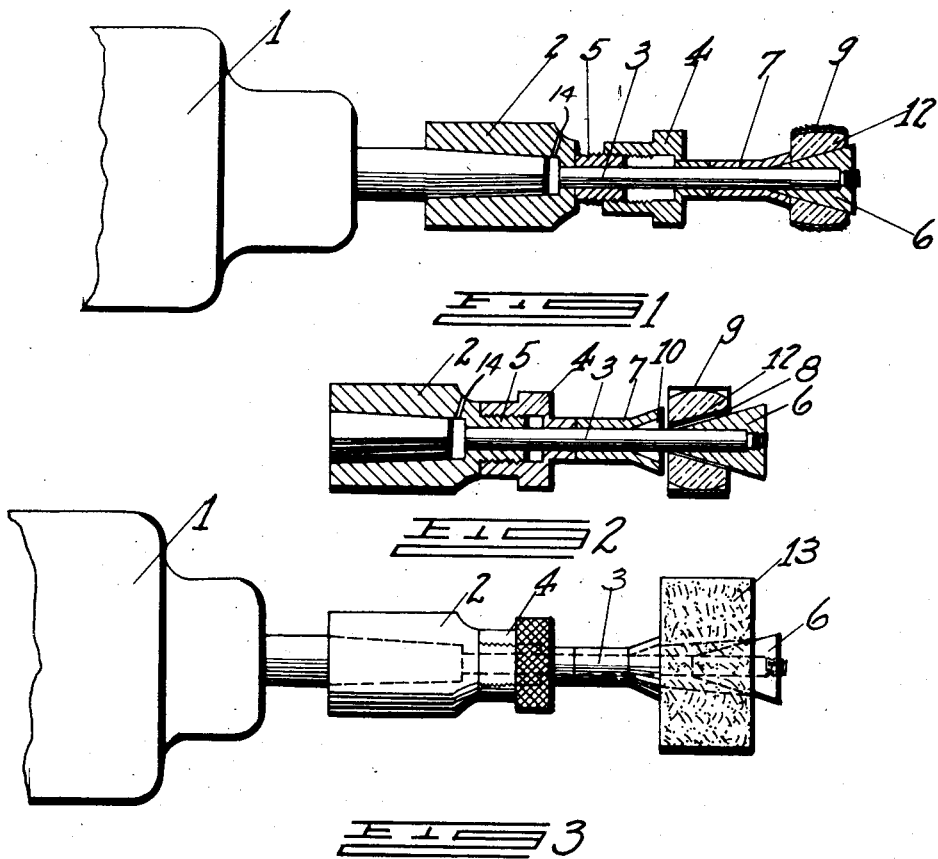
INVENTOR.
Frederick Jenkins
BY
Allen & Allen
ATTORNEYS Patented Aug. 20, 1929.

1,725,002

UNITED STATES PATENT OFFICE.

FREDERICK JENKINS, OF CINCINNATI, OHIO.

HOLDER FOR POLISHING DEVICES.

Application filed October 3, 1927. Serial No. 223,567.

My invention relates to arbors for holding emery bands and other buffing and polishing tools as used by dentists, jewelers and the like for attachment to lathes.

In the art in dental and jewelers' lathes it has long been customary to mount a rubber ring on a rotatable shaft of a motor. Over the rubber ring it has been customary to attach a strip of emery cloth with the ends attached together in the form of a band which fits over the rubber ring. For holding the emery cloth in position and giving the desired transverse curvature to the emery cloth a frequent arrangement has been the provision of thin threaded discs which engage the side edges of the rubber and upon adjustment squeeze the rubber ring and thus lock the emery cloth in place.

With the older constructions for different sizes of emery bands which are furnished by dental supply houses of standard sizes flat emery rings could not be secured without considerable difficulty. Also, the construction was not adapted for the convenient mounting of the numerous forms of burr and polishing wheels in use by jewelers and dentists.

It is the object of my invention to provide a mounting for emery rings and burr and polishing wheels which shall remedy the above difficulties and with which particularly flat emery rings can be used.

The invention consists of that certain novel construction and arrangement of parts to be hereinafter particularly pointed out and claimed in the ensuing specifications in which I have disclosed a preferred embodiment illustrating my invention.

In the drawings:—

Figure 1 is a central longitudinal section of my holder with the emery band secured in place.

Figure 2 is a similar section with the parts in position for mounting the emery band.

Figure 3 is a similar section to that shown in Figure 1 with a polishing wheel mounted on the holder.

The holders are usually mounted on the shaft of an electric motor, which motor is indicated at 1, to which the body 2 of the holder is secured in any well known way. Secured to the body 2 is the spindle 3 which runs loosely through an adjusting nut 4 which is screw threaded with left to right threads to prevent unscrewing with the rotation of the body on the projecting end 5 of the body.

On the end of the spindle 3 is screwed a cone shaped nut 6 arranged to engage in a corresponding cone shaped recess 10 in a spindle collar 7 mounted loosely on the spindle. A rubber ring 12 with a corresponding cone shaped opening 8 to fit the cone nut 6 is provided. This rubber ring has its periphery curved to give the desired curvature to the emery band 9 which in the position shown in Figure 2 with the rubber ring pushed inwardly off of the cone nut 6 can be readily slipped over the ring. Then upon tightening up the adjusting nut against the spindle collar the rubber ring 12 will be forced outwardly on the cone and will be caused to expand against the emery band locking it tightly in position and causing it to take the curvature of the periphery of the rubber ring. It is usual to furnish emery bands of different standard diameters and rubber rings are furnished for the different sizes.

Where it is desired to use and secure flat emery bands, rubber rings with a corresponding surface may be furnished. The fact that the aperture in the rubber ring is cone shaped at the same angle as the angle of the cone nut causes a uniform expansion of the rubber ring whether the outside periphery is flat or curved, so that the emery band will be locked in place.

When it is desired to employ the device for any of the different sizes of buffing or polishing wheels the wheel 13 will be substituted for the rubber ring and it can be tightly held by forcing the spindle collar against the hub of the wheel and clamping it against the conical surface of the cone nut 6.

In order to allow the air to escape when the holder is driven in the lathe spindle I provide a small air hole 14 for this purpose.

Having thus described my invention, what I claim as new and desire to secure by Letters Patent, is:—

1. In combination with a rotatable spindle, a sleeve on said spindle having a tapered orifice, a resilient ring for supporting an abrasive band, said ring having a tapered orifice extending therethrough, and a lock nut threaded on said spindle and having a tapered extension to fit within the tapered orifice in said ring and uniformly expand said ring so as to support an abrasive band in a position conforming to the normal shape of the periphery of said band.

2. In combination with a rotatable spindle, a sleeve on said spindle having a tapered orifice, a resilient ring for supporting an abrasive band, said ring having a tapered orifice extending therethrough, and a lock nut threaded on said spindle and having a tapered extension to fit within the tapered orifice in said ring and uniformly expand said ring so as to support an abrasive band in position conforming to the normal shape of the periphery of said band, and manual means for adjusting the position of said sleeve on said shaft thereby adjusting the position of said ring on the tapered extension of said lock nut.

FREDERICK JENKINS.